United States Patent
Maas et al.

(10) Patent No.: US 6,539,656 B2
(45) Date of Patent: Apr. 1, 2003

(54) LUMINAIRE AND LIGHT-EMITTING PANEL (75) Inventors: Theodorus Mattheus Maria Maas, Eindhoven (NL); Jelle Hilbrand Schuurmans, Eindhoven (NL); Constance J. E. Saalberg-Seppen, Arnhem (NL); Edwin Van Lier, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/754,636

(22) Filed: Jan. 4, 2001

(65) Prior Publication Data

US 2001/0049893 A1 Dec. 13, 2001

(30) Foreign Application Priority Data

Jan. 6, 2000 (EP) ............................................. 00200028
Apr. 6, 2000 (EP) ............................................. 00201253

(51) Int. Cl.[7] .............................................. G09F 13/18
(52) U.S. Cl. ....................................................... 40/546
(58) Field of Search .......................................... 40/546

(56) References Cited

U.S. PATENT DOCUMENTS

| | | | | |
|---|---|---|---|---|
| 5,177,889 A | | 1/1993 | Ching Hwei ................ | 40/204 |
| 5,640,792 A | * | 6/1997 | Smith et al. .................... | 40/546 |
| 5,786,665 A | | 7/1998 | Ohtsuki et al. ............. | 313/512 |
| 5,842,297 A | | 12/1998 | Tung ............................. | 40/546 |

FOREIGN PATENT DOCUMENTS

| | | | | |
|---|---|---|---|---|
| DE | 3833315 A1 | 4/1990 | ............. | G09F/9/33 |
| EP | 0945674 A1 | 9/1999 | ............. | F21V/8/00 |

* cited by examiner

Primary Examiner—Cassandra H. Davis
(74) Attorney, Agent, or Firm—Frank Keegan (57) ABSTRACT

A luminaire comprises a relatively thin and flat light-emitting panel (1) having a light-emitting window (2) and, opposite said light-emitting window, a rear wall (3) with opposed edge surfaces (4, 14). At least one of the edge surfaces (4) is light transmitting and associated with a plurality of light sources (5, 5', 5", ... ). Light originating from the light sources (5, 5', 5", ... ) is spread in the panel (1). The invention is characterized in that a plurality of deformities (7, 7', 7", ... ; 8, 8', ... ) is provided in the panel (1) for extracting light from the panel (1) via the light emission window (2). The deformities (7, 7', 7", ... ; 8, 8', ... ) are clustered so as to form at least one light symbol (27; 28). The configuration of the clusters (17; 18) of deformities (7, 7', 7", ... ; 8, 8', ... ) corresponds to the shape of the light symbol (27; 28). Preferably, the luminaire has a first and a second light-transmitting edge surface, with respectively, a first and a second plurality of light sources being associated with said surfaces. A first cluster of deformities only couples light from the first light source out of the panel, thereby forming a first light symbol, while a second cluster of deformities only couples light from the second light source out of the panel, thereby forming a second light symbol, independently of the formation of the first light symbol. The luminaire according to the invention provides independent lighting and coloring possibilities of light symbols in a single-panel luminaire.

5 Claims, 7 Drawing Sheets

LUMINAIRE AND LIGHT-EMITTING PANEL

BACKGROUND OF THE INVENTION

The invention relates to a luminaire comprising a panel of a light-transmitting material, which panel includes a light emission window, a rear wall opposite said light emission window and edge surfaces which are situated between the light emission window and the rear wall, at least one of the edge surfaces of the panel being light transmitting, at least one light source being associated with the light-transmitting edge surface, and in operation, light originating from the light source being incident on the light-transmitting edge surface and spreading in the panel.

The invention further relates to a light-emitting panel for use in the luminaire.

Such luminaires are known per se and are also referred to as edge lighting systems. They are applied, inter alia, in so-called luminous signs, among other things, for advertising purposes. They can also be used in guiding boards, such as "exit"-signs, in billboards, traffic lights, systems for guiding traffic flows and as (dashboard) lighting in vehicles. Said luminaires are further used as back lighting, for example, for display devices, such as LCD-devices. Said luminaires are used both as interior lighting and exterior lighting.

In such luminaires, a tubular low-pressure mercury-vapor discharge lamp, for example a (compact) fluorescent lamp (TL), is generally used as the light source, and the light emitted, in operation, by said light source is coupled into an optical waveguide which generally forms a relatively thin and flat panel, which panel is made, for example, of a synthetic resin or glass, and light being transported through the panel under the influence of total internal reflection. A text or a logo, for example a brand name, is engraved in the optical waveguide, the engraving lighting up, in operation, as a diffuse luminous area. The engraving is formed, for example, by etching or by suitably providing scratches. A text or a logo may alternatively be provided by applying a (light-scattering) layer on the panel. A text or a logo may alternatively be provided on a tape applied to the panel, which tape may exhibit differences in refractive index.

Such a luminaire may also be provided with an alternative light source in the form of a plurality of opto-electronic elements, also referred to as electro-optic elements, such as electroluminescent elements, for example light-emitting diodes (LEDs). These light sources are generally provided so as to be close to or abut against a light-transmitting edge surface of the panel, so that, in operation, light originating from the light source is incident on the light-transmitting edge surface and spreads into the panel.

From DE-A 38 33 315 an LED edge lighting system is known, which comprises one or more light-emitting diodes which are coupled via optical waveguides to a light-emitting panel to cause a light surface or light symbol provided in or on the light emission window to light up. This light surface or light symbol is provided as a light-scattering layer on the surface of the panel, or as a light-scattering recess in the surface of the panel.

A luminaire of the type mentioned above has various drawbacks. For example, only a part of the light in the panel contacting the light symbol is coupled out of the panel, and, in addition, a part of the light is emitted in the direction of the rear wall. Besides, the light symbol lights up like a diffusely luminescent area. As a result, the attractiveness of the luminaire is reduced.

SUMMARY OF THE INVENTION

It is an object of the invention to obviate the above drawbacks. The invention more particularly aims at providing a luminaire of the type mentioned in the opening paragraph, in which light is coupled out so as to obtain a specific light distribution.

To achieve this, the luminaire is characterized in accordance with the invention in that in the panel a plurality of deformities is provided for coupling light out of the panel via the light emission window, said deformities being clustered so as to form at least one light symbol, and said cluster having a configuration which corresponds to the shape of the light symbol.

The measure in accordance with the invention causes the attractive effect, the appeal and the attention value of the luminaire in accordance with the invention to be increased. The term "deformities" is to be taken to mean, in general, in the description and the claims of the current invention, means by means of which light can be coupled out of the panel. A deformity is an optical structure having a predetermined geometrical shape and dimensions. The use of deformities enables light to be coupled out of the panel in a well-defined manner. The light is coupled out in a predetermined direction, which direction may also depend upon the shape and the position of the deformity on the panel. This means, inter alia, that an observer who moves past the luminaire without specifically looking in the direction of the panel is struck at a certain moment "from the corner of his eye" by light emitted by the luminaire in accordance with the invention. This unexpected occurrence arouses the attention of the observer and "forces" as it were the observer to look at the luminaire. This results in an increase of the attention value of the luminaire.

The deformities serve as a secondary light source.

An additional advantage of these deformities is that clusters of deformities can be selectively illuminated. By virtue thereof, it becomes possible to make different light symbols light up independently from each other and/or sequentially. By making light symbols light up alternately, using control electronics, by causing the clusters of deformities associated therewith to couple light out of the panel, light objects that move as it were can be obtained (for example a man who seems to be walking), or a text can be made visible by making the letters light up one after the other. Also various, colored light sources can be alternately switched on and off, so that a light symbol lights up in various colors. In this manner, the luminaire in accordance with the invention obtains dynamic lighting possibilities with a high attention value.

A further advantage of these deformities is that more light is coupled out of the panel, which leads to a directed reflection of these deformities and hence an improved brightness of the luminaire. To direct the light which is coupled out of the panel by these deformities, preferably, a boundary surface of the deformities is provided with a specularly reflecting surface, for example a reflecting layer of aluminium or silver, or a reflective multilayer coating. In an alternative, preferred embodiment, the deformities are shaped such that, in the deformities, total internal reflection causes the light to be coupled out of the panel. An important advantage of total internal reflection as a way of coupling light out of the panel is that it is not necessary to locally provide the deformities with a reflecting surface.

In the known luminaire, light incident on the diffusely reflecting light symbol when being reflected to and fro in the panel is emitted in all directions, for example also in the direction of the rear wall. As a result, the brightness of the luminaire in a direction transverse to the panel is lower than that of the light source, leading to a reduction of the attractiveness of the luminaire.

It is to be noted that the provision of a plurality of deformities to couple light out of a luminaire is known per se. In such edge lighting systems, a plurality of light-extracting so-called "deformities" or "disruptions" are provided in the light-emitting panel. The shape and/or dimensions of these deformities may change gradually and/or the distance between the deformities in the panel may change gradually. However, the objective of such edge lighting systems is to obtain a light distribution which is as uniform as possible, said systems serving, in particular, as a lighting panel for, for example, (flat) display devices, such as, for example, liquid crystal display devices. The light distribution of the luminaire in accordance with the invention deliberately is not homogenous and not uniform. These (dynamic) deviations from a homogeneously and uniformly illuminated panel add to the attention value of the luminaire.

A preferred embodiment of the luminaire is characterized in accordance with the invention in that at least a first and a second edge surface are light-transmitting, at least one first light source being associated with the first light-transmitting edge surface, and at least one second light source being associated with the second light-transmitting edge surface, and in operation, a first cluster of deformities coupling out light originating from the first light source to form a first light symbol, and in operation, a second cluster of deformities coupling out light originating from the second light source to form a second light symbol.

In the known luminaire, at a specific location on the panel only one specific light symbol (for example the letter "P") can be made to light up or a collection of light symbols (for example the words "ACCESS DENIED") can be made to light up simultaneously. In the above-mentioned embodiment of the luminaire in accordance with the invention, two light symbols (for example the letter "E" and the letter "A") or two collections of light symbols (for example the word "EXIT" and the words "NO ENTRY") can be made to light up on the panel independently of each other. In addition, these light symbols or collections of light symbols can locally overlap entirely or partly. Thus, in this embodiment it is possible to switch from one text to the other text. It is also possible to add text to an existing text (for example by replacing the term "ENTRY" by "NO ENTRY"), or by providing a brand name or logo with a crown or with symbols in the form of, for example, stars, which additional light symbols can be switched on and switched off, depending on the requirements.

It is further possible in this embodiment of the luminaire in accordance with the invention that two light symbols or two collections of light symbols have different colors (for example a text or brand name which lights up in green and/or in blue, above which there is a star and/or a crown which lights up in red and/or yellow). By coupling out light by associating a first cluster of deformities with a first light source, and by coupling out light by associating a second or further cluster of deformities with a second or further light source, the number of lighting possibilities is increased substantially and the attractive value of the luminaire in accordance with the invention is substantially increased. In general, a plurality of panels whose light emission windows are arranged, for example, parallel to each other are necessary to make seemingly overlapping light symbols light up independently of each other. Such stacks of panels take up too much space, require much material, are relatively heavy and large and hence expensive.

To make sure that the light is coupled out of the panel so as to travel in (a) specific direction(s), the deformities are preferably arranged in the rear wall of the panel. If light, which is reflected to and fro by the panel, is incident on such a deformity or optical structure in the rear wall, reflection occurs, causing light to be sent towards the light emission window and leave the panel at the light emission window. In an alternative embodiment, the deformities are provided in or on the light emission window of the panel. These deformities may have, for example, a lens structure.

The shape, dimensions and location of the deformities influence the way in which light leaves the panel. For example, a preferred embodiment of the luminaire in accordance with the invention is characterized in that the shape of the deformity is selected from the group formed by a triangular prism, a tetrahedron, a quadrilateral pyramid and a cone. Such shapes are very suitable for coupling light out of the luminaire in various ways.

A deformity in the form of a triangular prism can very suitably be used to allow unobstructed passage of light in one direction and couple said light out of the panel in a direction transverse thereto. A favorable embodiment of the luminaire in accordance with the invention is characterized in that the deformity is a triangular prism, a side face of the prism being provided transversely to the rear wall, if the deformity forms part of the first cluster of deformities, ribs of the prism extend transversely to the direction wherein, in operation, the first light source emits light, and if the deformity forms part of the second cluster of deformities, ribs of the prism extend transversely to the direction wherein, in operation, the second light source emits light.

In this embodiment, the triangular prisms are situated with a side face on or in the rear wall of the panel. In the embodiment described, the following effects occur. Light originating from the first light source is reflected at the side faces of the prisms of the first cluster of deformities, while light originating from the second light source is passed via the upper face and the lower face of the prisms of the first cluster. It is noted for clarity that side faces of a prism are situated between the ribs of the prism, while the upper face and the lower face are situated at the so-called end faces of the prism. Conversely, light originating from the second light source is reflected at the side faces of the prisms of the second cluster of deformities, while light originating from the first light source is passed via the side faces of the prisms of this second cluster. If only the first light source is switched on, then only the deformities forming part of the first cluster couple light out of the panel, which deformities thus form the first light symbol and cause it to light up. Correspondingly, only the deformities forming part of the second cluster couple light out of the panel, which deformities thus form the second light symbol and cause it to light up. If both light sources are switched on, then both clusters of deformities couple out light, thus forming both light symbols. If, in addition, the first and the second light sources couple light of different colors into the panel, then the light symbols having these different colors light up independently of each other. In this manner, a luminaire having a great attractive effect and a high attention value is obtained. By suitably switching on and off the light sources, a luminaire having dynamic lighting possibilities is obtained in this manner.

If, for example, the panel of a luminaire is triangular in shape, with light sources being associated with all three edge surfaces, and the ribs of the three types of triangular prisms extending transversely to the direction in which, in operation, the respective light sources emit light, then also the prisms of the other two clusters will reflect part of the light emitted by the first light source. In the case of a triangular panel, it is advantageous to employ deformities in the form of tetrahedrons. Each one of the side faces of a tetrahedron is then associated with one of the edge surfaces of the panel.

It is particularly favorable if the upper face and the lower face of the prisms are provided in a direction transverse to the rear wall. By virtue thereof, light which is reflected at the upper or the lower face of a prism as a result of the transition from or to such an upper or lower face, is emitted in the same, yet oppositely directed, direction. In this manner, such light cannot be coupled out of the panel. It is further very favorable if the side faces of the prisms exhibit total internal reflection.

The scope of protection of the invention also comprises a light-emitting panel provided with deformities for use in a luminaire as described in this description and the claims.

These and other aspects of the invention will be apparent from and elucidated with reference to the embodiments described hereinafter.

BRIEF DESCRIPTION OF THE DRAWINGS

In the drawings.

The Figures are purely diagrammatic and not drawn to scale. Particularly for clarity, some dimensions are exaggerated strongly. In the Figures, like reference numerals refer to like parts whenever possible.

DETAILED DESCRIPTION OF THE PREFERRED EMBODIMENTS

Figure 1A:
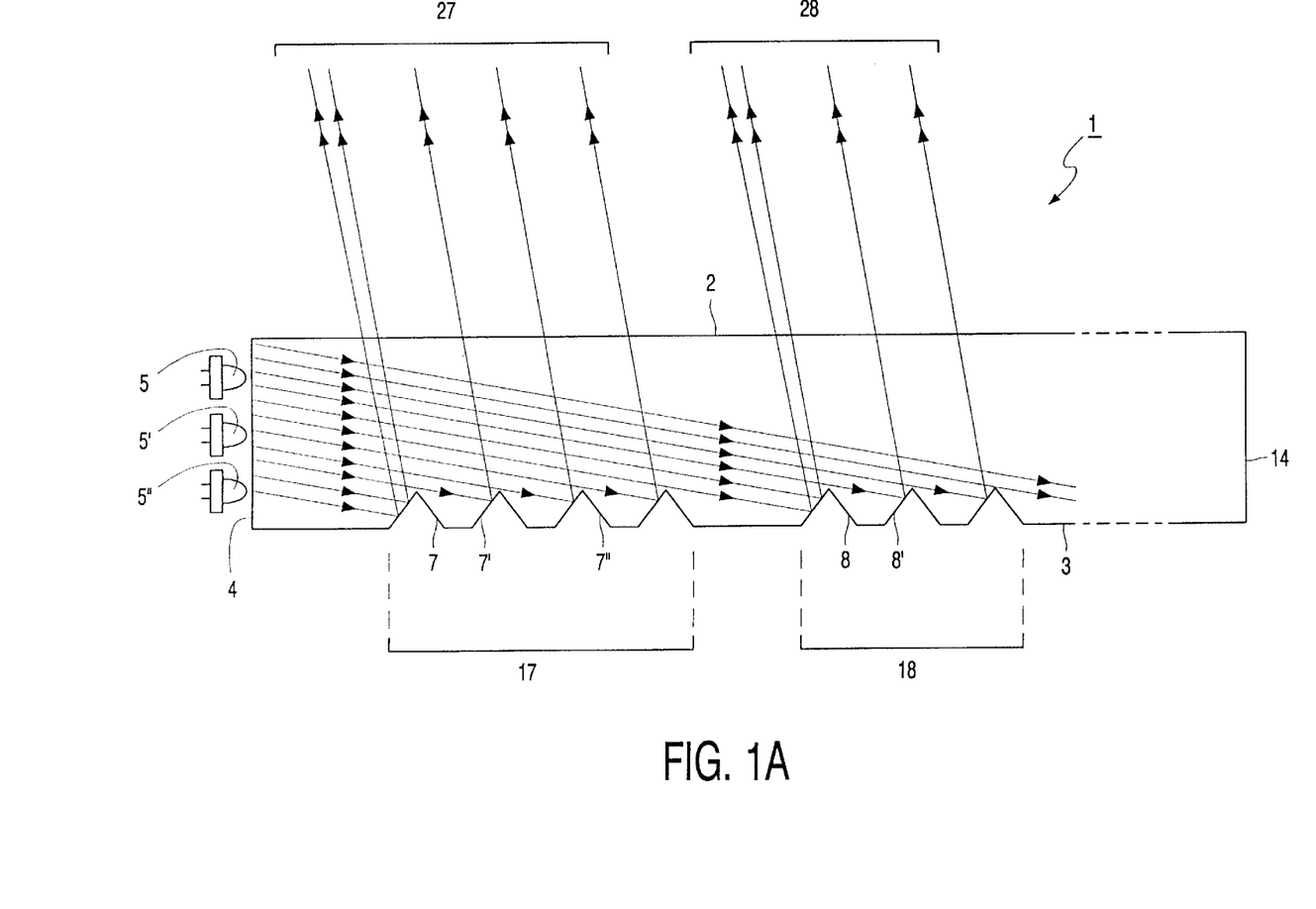
FIG. 1A is a cross-sectional view of an embodiment of a luminaire in accordance with the invention.

FIG. 1A is a cross-sectional view of an embodiment of a luminaire in accordance with the invention. The luminaire comprises a panel 1 of a light-transmitting material. The panel 1 is manufactured, for example, from a synthetic resin, acryl, polycarbonate, PMMA, for example Perspex, or glass. Under the influence of total internal reflection, light is transported through the panel 1, during operation. The panel 1 has a light emission window 2 and a rear wall 3 situated opposite said light emission window. Between the light emission window 2 and the rear wall 3 there are edge surfaces 4, 14. In the example shown in FIG. 1A, the edge surface referenced 4 is light-transmitting, and a light source 5, 5', 5", . . . is associated with said edge surface.

In this example, the light source 5, 5', 5", . . . comprises a plurality of light-emitting diodes (LEDs), however, a different light source is also possible, such as a discharge lamp or, in general, a plurality of opto-electronic elements, also referred to as electro-optic elements, such as electroluminescent elements. The source brightness of LEDs is many times higher than that of fluorescent tubes. In addition, when use is made of LEDs, the efficiency with which light is coupled into the panel is higher than in the case of fluorescent tubes. The use of LEDs as the light source has the advantage that the LEDs may abut against panels made of a synthetic resin. LEDs hardly emit heat, nor do they emit harmful (UV-)radiation. The use of LEDs has the additional advantage that means for coupling light originating from the LEDs into the panel are not necessary. The use of LEDs leads to a more compact luminaire.

To obtain a luminaire having a high attraction value, use can be made of so-called power packages of LEDs. For example, high-efficiency, high-output LEDs of the "Barracuda" type (Hewlett-Packard) can be used. The luminous flux per LED is 15 lm for red LEDs, 13 lm for green LEDs, 5 lm for blue LEDs and 20 lm for amber LEDs. The use of these high-efficiency, high-output LEDs has the specific advantage that the number of LEDs necessary for a desired, relatively high light output can be relatively small. This adds to the compactness and the efficiency of the luminaires to be manufactured. In an alternative embodiment, high-efficiency, high-output LEDs of the "Prometheus" type (Hewlett-Packard) are used, in which case the luminous flux per LED is 35 lm for red LEDs, 20 lm for green LEDs, 8 lm for blue LEDs and 40 lm for amber LEDs.

By using LEDs as the light source, daylight-viewable luminaires are obtained whose brightness is comparable to, or better than, the brightness of a luminaire based on light generated in luminaires on the basis of fluorescent tubes or neon light.

Preferably, the LEDs are mounted on a metal-core printed circuit board. If power LEDs are mounted on such a metal-core printed circuit board (MC-PCB), the heat generated by the LEDs can be readily dissipated by heat conduction via the PCB. An interesting embodiment of the luminaire comprises a housing, accommodating the LEDs, which is made of metal and provided with cooling fins, and, in said embodiment, the metal-core printed circuit board is in contact with the metal housing via a heat-conducting connection. Such a heat-conducting connection is preferably formed by mounting the MC-PCB on a metal plate which is connected to the metal housing. The heat generated in the LEDs can be dissipated by means of (thermal) conduction via the MC-PCB and the metal plate to the housing and the cooling fins, so that heat is emitted to the environment. This has the advantage that forced air cooling for removing heat, as applied in the known luminaire, is not necessary.

In operation, light originating from the light source 5, 5', 5", . . . is coupled into the panel 1 via the light-transmitting edge surface 4, which light spreads in the panel 1. In accordance with the principle of total internal reflection, the light continues to move back and forth in the panel 1 unless the light is coupled out of the panel 1, for example, by a deformity that has been provided. The edge surface opposite the light-transmitting edge surface 4 is referenced 14 and is preferably provided with a reflecting coating (not shown in FIG. 1A) to hold the light originating from the light source 5, 5', 5", . . . inside the panel. Without this reflecting coating, an edge surface is obtained having an attractive appearance. In an alternative embodiment, both opposed edge surfaces are provided with light sources.

In accordance with the measure of the invention, the panel 1 comprises a plurality of deformities 7, 7', 7", . . . ; 8, 8', . . . for coupling light out of the panel 1 via the light emission window 2. In FIG. 1A, the deformities 7, 7', 7", . . . ; 8, 8', . . . are provided in the rear wall 3 of the light-emitting panel 1. In an alternative embodiment, the deformities are provided in the light emission window 2 or, in a different manner, for example on the outside of the panel 1. In FIG. 1A, two clusters 17; 18 of deformities 7, 7', 7", . . . ; 8, 8', . . . are indicated. The deformities 7, 7', 7", . . . ; 8, 8', . . . serve as means for coupling light out of the panel 1. The deformities 7, 7', 7", . . . ; 8, 8', . . . form optical structures and are preferably provided with a specularly reflecting coating (see FIG. 3). Particularly favorable deformities 7, 7', 7", . . . ; 8, 8', . . . are those where total internal reflection causes light to be coupled out of the panel 1. In a further alternative embodiment, the deformities are diffusely reflecting. A suitable combination of specularly and diffusely reflecting deformities also forms a favorable embodiment of the invention. By means of said combination, conspicuous light effects can be achieved. For example, a specularly reflecting light symbol serving to draw attention may be used in a diffusely reflecting light symbol.

A deformity in the panel serves as a secondary light source. A specific optical system may be associated with this secondary light source, which optical system is provided, for example, on the light emission window (not shown in FIG. 1A). The optical system may be used to form a parallel light beam.

FIG. 1A very diagrammatically shows light rays originating from the light source 5, 5', 5", . . . , which light rays touch the surface of the deformities 7, 7', 7", . . . ; 8, 8', . . . , causing the light rays to be reflected at said surface. The reflected light rays are directed, away from the rear wall 3, towards the light emission window 2 and are thus coupled out of the panel 1 at the location of said light emission window 2. The clusters 17; 18 of deformities 7, 7', 7", . . . ; 8, 8', . . . each form one light symbol 27; 28, the cluster 17; 18 having a configuration which corresponds to the shape of the light symbol 27; 28. For clarity, the light rays in FIG. 1A are drawn so as to be parallel to each other. In practice, a plurality of directions will travel through the light-emitting panel. Light can only leave the panel 1 if the angle of incidence of the light at the light emission window is smaller than the critical angle.

Figure 1B:
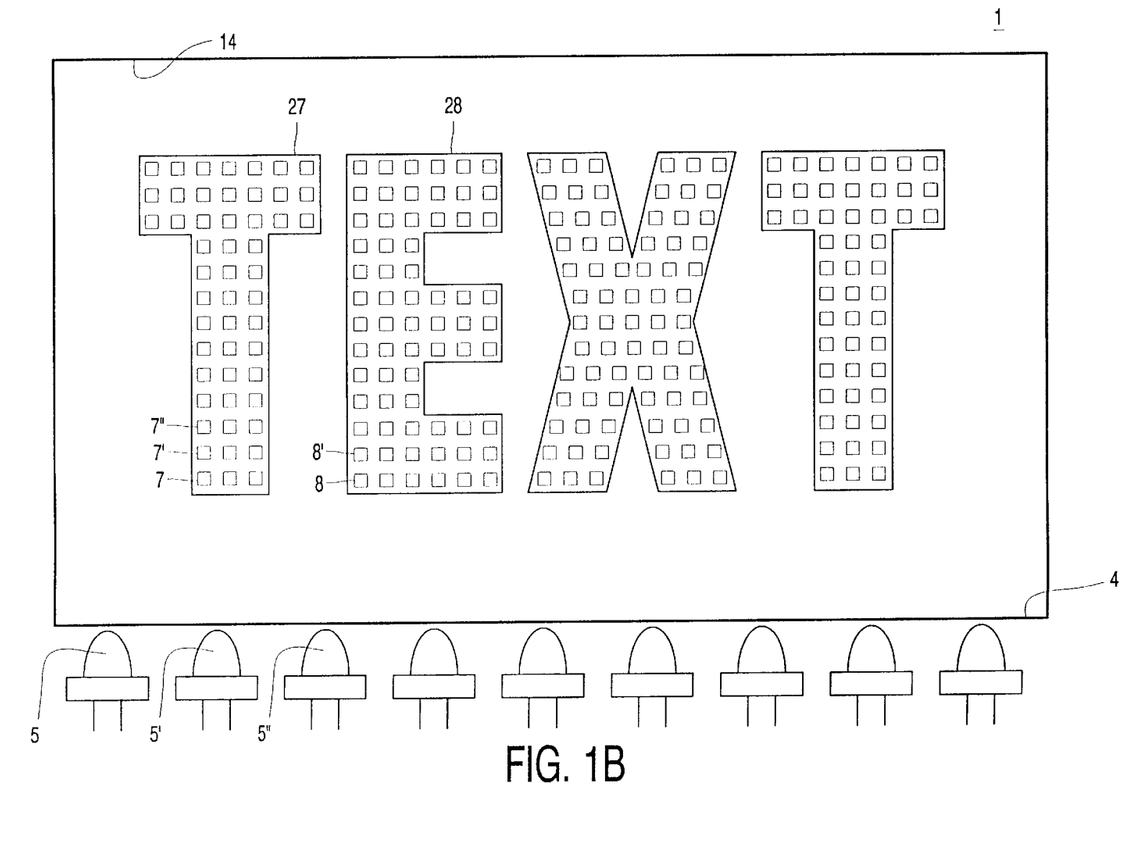
FIG. 1B is a front view of the luminaire shown in FIG. 1A.

FIG. 1B shows a front view of the luminaire shown in FIG. 1A, with a "text" lighting up during operation. Each one of the light symbols 27; 28 is formed by light originating from a plurality of LEDs 5, 5', 5", . . . , which light is coupled into the panel 1 via the edge surface 4, and which light is coupled out by reflecting deformities 7, 7', 7", . . . ; 8, 8', . . . , which are arranged in clusters the configuration of which corresponds to the light symbol 27; 28 formed.

Figure 2A:
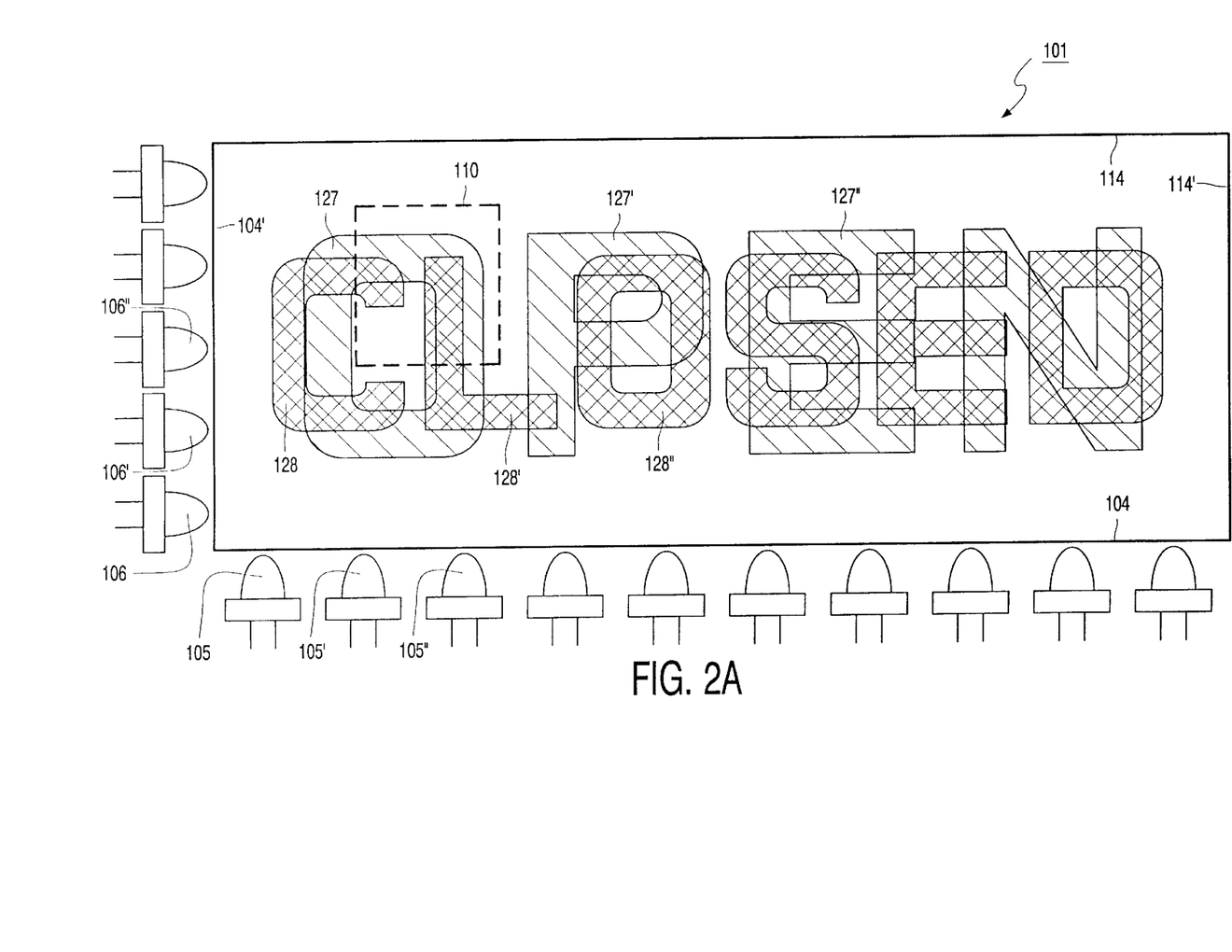
FIG. 2A is a cross-sectional view of an alternative embodiment of a luminaire in accordance with the invention.
Figure 2B:
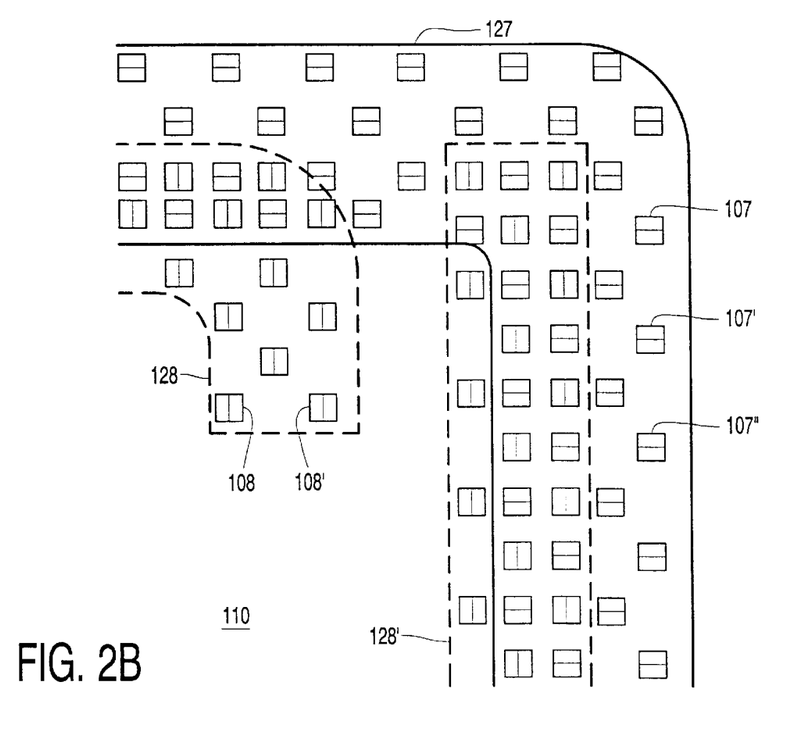
FIG. 2B shows a detail of the embodiment of the luminaire shown in FIG. 2A.

FIG. 2A is a cross-sectional view of an alternative embodiment of a luminaire in accordance with the invention. With respect to FIGS. 1A and 1B, corresponding parts in FIGS. 2A and 2B are indicated by reference numerals which are 100 higher. The luminaire comprises a panel 101 having a first light-transmitting edge surface 104 and a second light-transmitting edge surface 104', each having an opposing edge surface 114 and 114', respectively, which reflect the light. A light emission window of the panel 101 corresponds to the plane of the drawing and, in FIG. 2A, is directed towards an observer of the panel 101. One first light source, in this example a plurality of LEDs 105, 105', 105", . . . , is associated with the first light-transmitting edge surface 104, and one second light source, in this example a further plurality of LEDs 106, 106', 106", . . . , is associated with the second light-transmitting edge surface 104'. In accordance with the invention, the luminaire is capable of making a first collection of light symbols 127, 127', 127", . . . and a second collection of light symbols 128, 128', 128", . . . light up independently. In this example, the first collection of light symbols 127, 127', 127", . . . jointly form the word "OPEN", and the second collection of light symbols 128, 128', 128", . . . jointly form the word "CLOSED".

The LEDs may all be a different color. This leads to a further increase of the attention value of the panel. By choosing, by way of example, green LEDs for the LEDs with reference numeral 105, 105', 105", . . . , and red LEDs for the LEDs with reference numeral 106, 106', 106", . . . , the first collection of light symbols lights up in green and the second collection of light symbols lights up in red. In other words, during operation, the word "OPEN", lights up in green and the word "CLOSED" lights up in red.

FIG. 2B shows a detail of the embodiment of the luminaire referenced 110 in FIG. 2A, the deformities 107, 107', 107", . . . ; 108, 108', . . . in the panel 101 (see FIG. 2A), which couple out light for making the collections of light symbols 127, 127', 127", . . . ; 128, 128', 128", . . . light up, being shown very diagrammatically. In accordance with the preferred embodiment of the invention, in operation, a first cluster of deformities 107, 107', 107" couples out light originating from the first light source 105, 105', 105", . . . to form a first light symbol 127, 127', 127", . . . , while, independently thereof, a second cluster of deformities 108, 108', . . . , in operation, couples out light originating from the second light source 106, 106', 106", . . . to form a second light symbol 128, 128', 128", . . . . The configurations of the clusters of deformities 107, 107', 107", . . . ; 108, 108', . . . correspond to the collections of light symbols 127, 127', 127", . . . ; 128, 128', 128", . . . .

In the example shown in FIG. 2B, two different types of deformities are drawn. One type of deformities 107, 107', 107", . . . is symbolically drawn as a square with a horizontal line, while the other type of deformities 108, 108', . . . is symbolically drawn as a square with a vertical line (also see FIG. 3 and the associated description).

The shape of the deformities 7, 7', 7", . . . ; 8, 8', . . . ; 107, 107', 107", . . . ; 108, 108', . . . is favorably chosen from the group formed by a triangular prism, a tetrahedron, a quadrilateral pyramid and a (truncated) cone. Such shapes are very suitable for coupling light out of the luminaire in various ways. The upright side faces of a tetrahedron and of a quadrilateral pyramid (see FIG. 5) are capable of independently reflecting light originating from different light sources and of independently coupling it out of the panel. The number of side faces of such deformities may depend upon the number of edge surfaces of the panel with which one or more light sources are associated. By means of a cone (not shown in the Figures), light originating from all directions can be coupled out of the panel.

Figure 3:
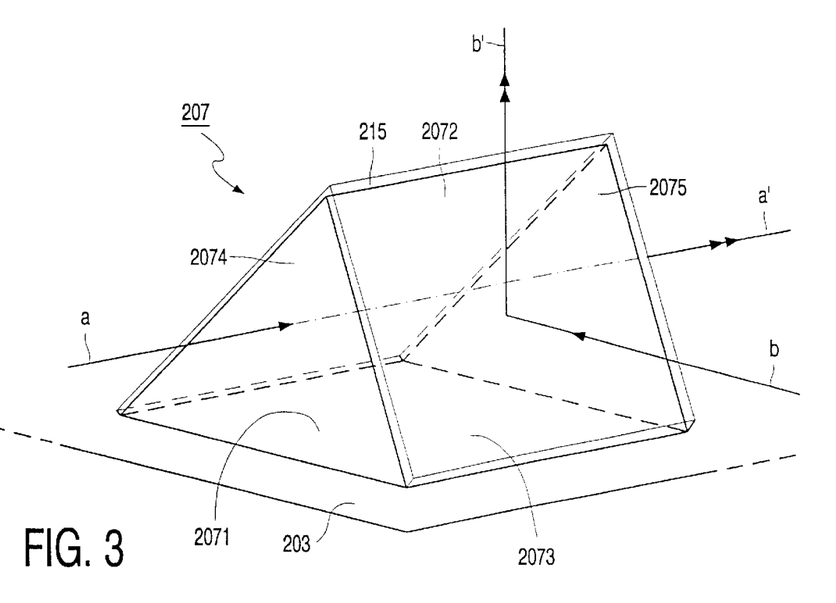
FIG. 3 shows the path of the light rays through a deformity in the form of a triangular prism.

A deformity in the form of a triangular prism is very suitable for allowing unobstructed passage of light in one direction and coupling it out of the panel in a direction transverse thereto. FIG. 3 shows a deformity in the form of a triangular prism 207 and the path of the light rays through such a prism. The deformity 207 is provided with a side face 2071 in the rear wall 203 of the panel. The other two side faces extending parallel to the ribs of the prism 207 are referenced 2072 and 2073 in FIG. 3. In the embodiment described, the following effects occur. A light ray travelling in the direction indicated by means of (a) in FIG. 3 is passed via the upper and the lower face 2074 and 2075 of the prism and continues on its way through the panel via the light line indicated by means of (a') in FIG. 3. Light traveling through the panel in a direction (b), transverse to the direction (a)-(a'), is incident on the reflecting surface 215 provided on the side faces 2071; 2072 and is reflected thereby, resulting in the formation of the light ray (b'), which is subsequently coupled out of the panel in a way as shown in FIG. 1A. If only the light source generating the light ray (b) is switched on, then the prismatic deformity 207 couples light out of the panel; such a prism, which forms part of a first cluster of deformities, thus contributes to the lighting up of a first light symbol. If only the light source generating the light ray (a) is switched on, then the prismatic deformity 207 does not couple light out of the panel; in this manner, such a prism does not contribute to the lighting-up of a first light symbol.

In FIG. 3, the side face boundary surfaces 2072 and 2073 of the triangular prism deformity 207 are provided with a reflecting coating 215. In an alternative embodiment, the prisms are formed such that total internal reflection in the prism causes light to be coupled out of the panel. The situation wherein the ribs of the prism do not extend parallel to the rear wall is not excluded. Furthermore, it may be advantageous if, on a side of the prisms facing away from the light source, the prisms have a greater height with respect to the rear wall than on the side of the prisms facing the light source. The prisms may also be obliquely provided in the panel in a different way, if desired. By virtue thereof, the direction in which the light is coupled in by the panel can be adjusted in accordance with the application or the requirements of the user. For example, it may further be desirable that light originating from the first light source is coupled out of the panel in a different direction than light originating from the second light source.

The deformities 107, 107', 107", ... in FIG. 2B are in the form of a triangular prism, as shown in FIG. 3, having horizontal ribs with respect to the plane of the drawing, and said deformities couple out light by reflection if the LEDs 105, 105', 105", ... are switched on, thereby contributing to the lighting up of the light symbol 127 which forms the letter "O" of the word "OPEN" in FIG. 2A. The deformities 108, 108', ... in FIG. 2B are in the form of a triangular prism having vertical ribs with respect to the plane of the drawing, and said deformities couple out light if the LEDs 106, 106', 106", ... are switched on, thereby contributing to the lighting up of the light symbol 128 which forms the letter "C" of the word "CLOSED" in FIG. 2A. If both light sources 105, 105, 105", ... ; 106, 106', 106", ... are switched on, then both collections of clusters of deformities 107, 107', 107", ... ; 108, 108', ... couple out light, resulting in the formation of both collections of light symbols 127, 127', 127", ... ("OPEN") and 128, 128', 128", ... ("CLOSED").

The apex of the prism shown in FIG. 3 may be flat, and the upper face may have a light-scattering effect. The prisms may alternatively be obliquely arranged with respect to the rear wall of the panel.

By suitably switching light sources on and off, by changing the color of the light sources switched-on, by providing suitable optical systems and by making various lighting symbols light up alternately and/or sequentially, a luminaire having dynamic lighting possibilities is obtained. By suitably mixing various colors also white light can be obtained.

A preferred embodiment of the luminaire comprises control electronics for changing the luminous flux of the light-emitting diodes 5, 5', 5", . . . , 6, 6', 6", . . . ; 105, 105', 105", . . . , 106, 106', 106", . . . . In this manner, a luminaire having a high attractive effect and a high attention value is obtained.

Figure 4:
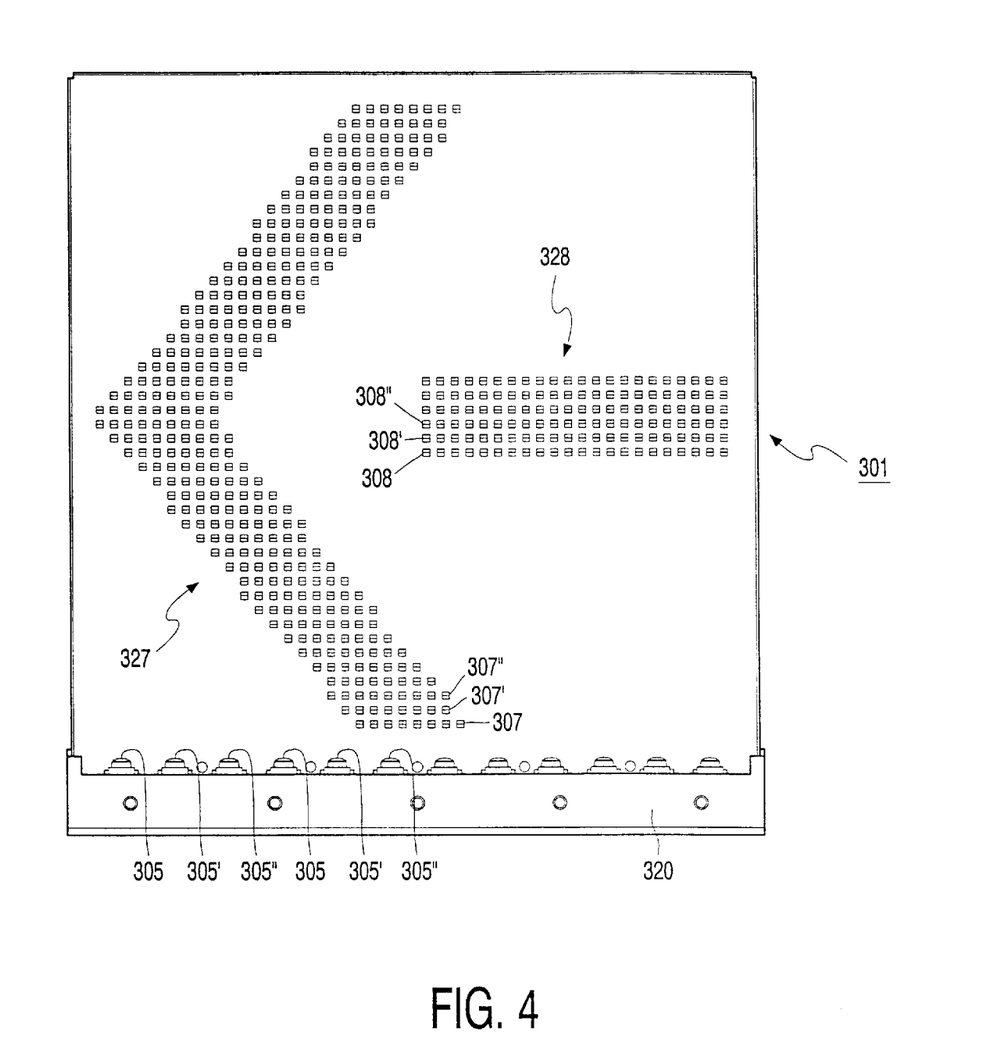
FIG. 4 is a cross-sectional view of an alternative embodiment of a luminaire in accordance with the invention.

FIG. 4 is a diagrammatic, cross-sectional view of an alternative embodiment of a luminaire in accordance with the invention. With respect to FIG. 2A, corresponding parts in FIG. 4 are indicated by reference numerals which are 200 higher. The luminaire comprises a panel 301 with a housing 302. In this example, the light source comprises a linear array of differently colored LEDs which are alternately arranged, i.e. red LEDs referenced 305, yellow LEDs referenced 305' and green LEDs referenced 305". The luminaire is capable of making a combination of two light symbols 327, 328 light up, which jointly form an arrow. By switching on LEDs of one specific color, the arrow lights up in this color. In this example, the arrow can light up in red, yellow or green, so that the arrow can very suitably be used for traffic applications, for example in traffic lights.

FIG. 4 diagrammatically shows deformities 307, 307', 307", . . . ; 308, 308', 308" . . . provided in the panel 301, which couple out light for making the light symbols 327, 328 light up. The deformities 307, 307', 307"; 308, 308', 308" . . . are in the form of a triangular prism, as shown in FIG. 3, having horizontal ribs with respect to the plane of the drawing, and said deformities couple out light by reflection if the LEDs 305, 305', 305" are switched on, causing the light symbols 327, 328 to light up.

By alternately switching on and off various colored light sources, the light symbols light up in various colors. As a result thereof, a luminaire in accordance with the invention has dynamic lighting possibilities with a high attention value.

Figure 5A:
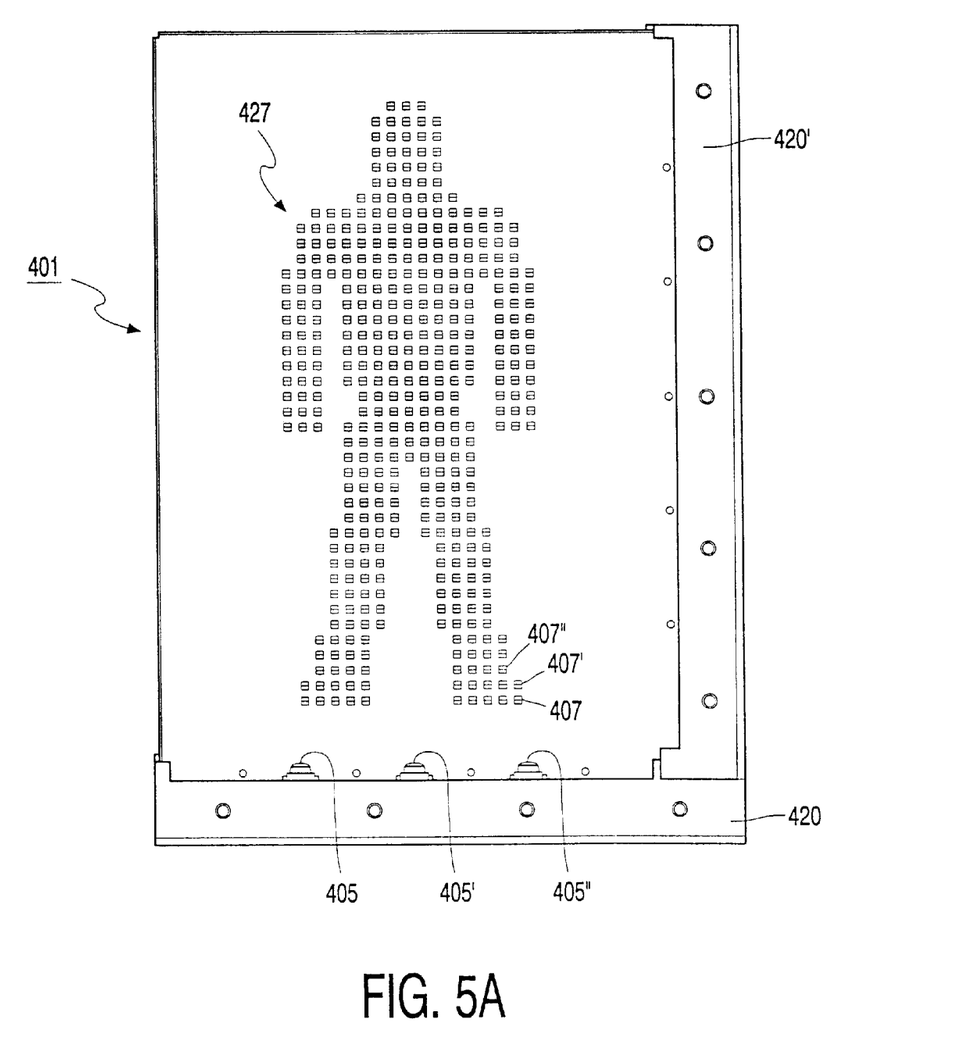
FIG. 5A is a cross-sectional view of an alternative embodiment of a luminaire in accordance with the invention.

FIG. 5A is a diagrammatic, cross-sectional view of a further alternative embodiment of a luminaire in accordance with the invention. With respect to FIG. 4, corresponding parts in FIG. 5A are indicated by reference numerals which are 100 higher. The luminaire comprises a panel 401 with a housing 420, 420'. In this example, the light source comprises a linear array of red LEDs 405, 405', 405". The luminaire is capable of making a light symbol 427 light up, which light symbol represents a stationary person. By switching on the red LEDs 405, 405', 405", said person lights up in this color. As a result, the luminaire can very suitably be used for traffic applications, in particular as a red traffic light at pedestrian crossings ("do not cross").

FIG. 5A diagrammatically shows deformities 407, 407', 407" provided in the panel 401, which couple out light for making the light symbol 427 light up. The deformities 407, 407', 407" are in the form of a triangular prism, as shown in FIG. 3, having horizontal ribs with respect to the plane of the drawing, and said deformities couple out light by reflection if the LEDs 405, 405', 405" are switched on, causing the light symbol 427 to light up.

Figure 5B:
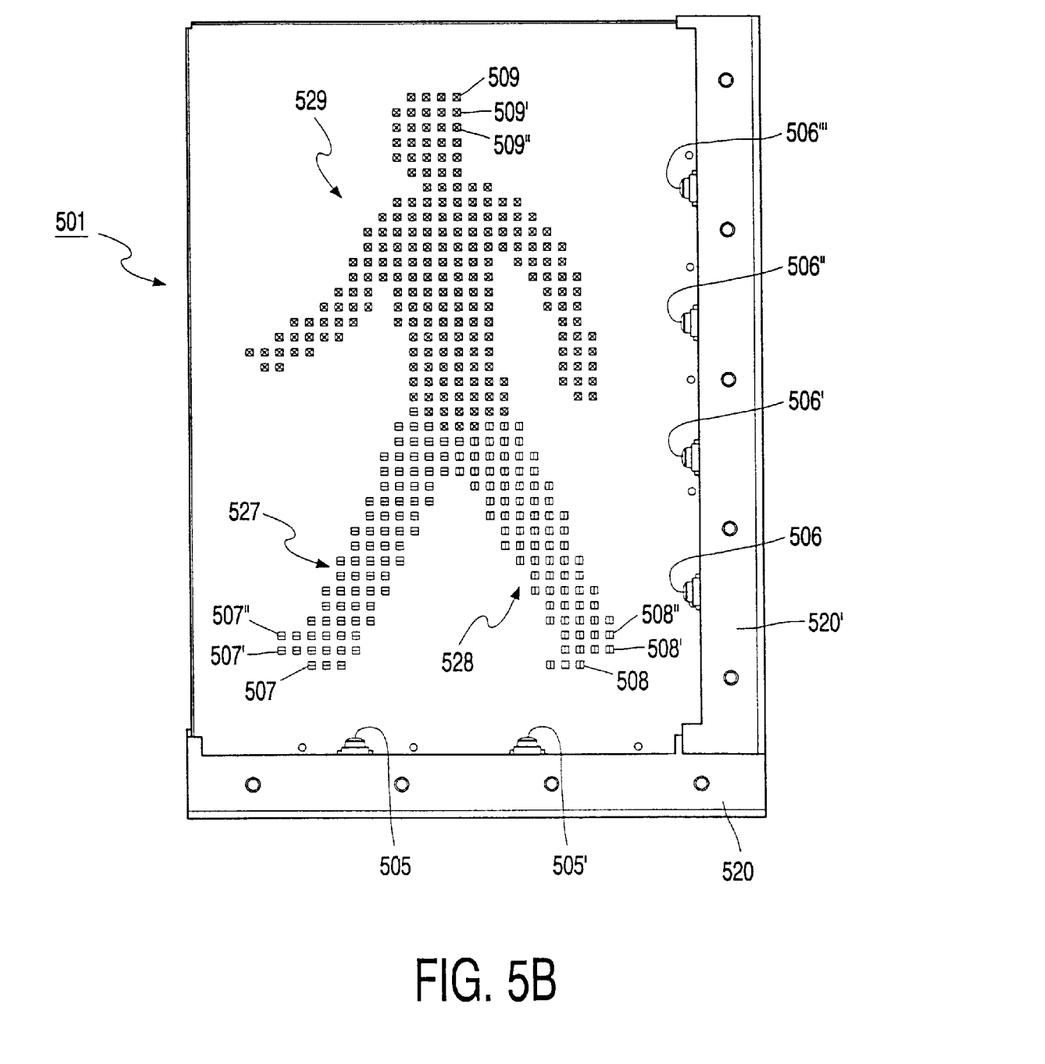
FIG. 5B is a cross-sectional view of an alternative embodiment of a luminaire in accordance with the invention.

FIG. 5B is a diagrammatic, cross-sectional view of a further alternative embodiment of a luminaire in accordance with the invention. With respect to FIG. 5A, corresponding parts in FIG. 5B are indicated by reference numerals which are 100 higher. The luminaire comprises a panel 501 with a housing 520, 520'. A first light source, in this example a plurality of green LEDs 505, 505', is provided in a part of the housing bearing reference numeral 520. A second light source, in this example a further plurality of LEDs 506, 506', 506", 506'", is provided in a further part of the housing bearing reference numeral 520'. In operation, the LEDs 505, 505' and the LEDs 506, 506', 506", 506'" emit light in two mutually perpendicular directions.

In the example shown in FIG. 5B, the luminaire comprises three different light symbols, referenced 527, 528 and 529, which, in operation, jointly form a person who seems to be walking. Deformities 507, 507', 507" couple out light for making the light symbol 427 light up. The deformities 507, 507', 507" are in the form of a triangular prism, as shown in FIG. 3, having horizontal ribs with respect to the plane of the drawing, and said deformities couple out light by reflection if the LEDs 505, 505' are switched on, causing the light symbol 527 to light up, which represents a person's right leg. Deformities 508, 508', 508" couple out light for making the light symbol 428 light up. The deformities 508, 508', 508" are in the form of a triangular prism, as shown in FIG. 3, having vertical ribs with respect to the plane of the drawing, and said deformities couple out light by reflection if the LEDs 506, 506' are switched on, causing the light symbol 528 to light up, which represents the person's left leg. Deformities 509, 509', 509" couple out light for making the light symbol 529 light up, which represents the upper part of the person's body. The deformities 509, 509', 509" are in the form of a quadrilateral pyramid, indicated in FIG. 5B as a square wherein a cross is drawn. The quadrilateral pyramids are provided at right angles to the plane of the drawing, the ribs of the base being alternately provided transversely to the directions wherein, in operation, the LEDs 505, 505'; 506, 506', 506", 506'" emit light. The deformities 509, 509', 509" couple out light by reflection if the LEDs 505, 505' are switched on as well as if the LEDs 506, 506' are switched on. In either case, they make the light symbol 529 light up.

The luminaire shown in FIG. 5B can very suitably be used for traffic applications, in particular as a green traffic light at pedestrian crossings ("safe to cross the street"). In operation, the LEDs 506", 506'" are continuously switched on, and the LEDs 505, 505' and the LEDs 506, 506' are alternately switched on. If the LEDs 505, 505' are switched on, the person's right leg is lifted, and if the LEDs 506, 506' are switched on, the person's left leg is lifted. A suitably chosen alternation results in a person who seems to be walking while lighting up green. If the luminaire is in operation, the LEDs 506", 506'" do not have to be switched on continuously. By suitably switching and taking into account the overlap between the on-periods, the light symbols 527, 528 and 529 are jointly capable of producing an attractive rendition of a person who seems to be walking. In this manner, the luminaire in accordance with the invention has dynamic lighting possibilities with a high attention value.

It will be obvious that, within the scope of the invention, many variations are possible to those skilled in the art.

The scope of protection of the invention is not limited to the examples given herein. For example, the panel does not have to be rectangular. The number of edge surfaces of the panel may be more than four, for example six or eight. The panel of the luminaire may be round or oval, if so desired, having light sources arranged in suitable positions. These edge surfaces may be associated with the differently placed and/or differently colored light sources. The shape of the deformities is adapted to the shape of the panel. In this manner, a plurality of patterns of luminescent and colored light symbols can be obtained.

The scope of protection of the invention is not limited to the examples given herein. The invention is embodied in each novel characteristic and each combination of characteristics. Reference numerals in the claims do not limit the scope of protection thereof. The use of the verb "to comprise" and its conjugations does not exclude the presence of elements or steps other than those stated in the claims. The use of the article "a" or "an" in front of an element does not exclude the presence of a plurality of such elements.

What is claimed is:

1. A luminaire comprising a panel of a light-transmitting material, said panel including a light emission window, a rear wall opposite said light emission window and edge surfaces which are situated between the light emission window and the rear wall, at least one first edge surface of the panel being light transmitting, at least one first light source being associated with the at least one first edge surface, and in operation, light originating from the at least one first light source being incident on the at least one first edge surface and spreading in the panel, wherein in the panel a plurality of deformities are provided for coupling light out of the panel via the light emission window, said deformities being clustered so as to form at least one first cluster of deformities, and said at least one first cluster having a configuration which corresponds to a shape of a first light symbol, and wherein at least one second edge surface is light-transmitting, at least one second light source being associated with the at least one second edge surface, in operation, the at least one first cluster of deformities coupling out light originating from the at least one first light source to form the first light symbol, and in operation, a second cluster of deformities coupling out light originating from the at least one second light source to form a second light symbol.

2. A luminaire as claimed in claim 1, wherein the at least one first cluster and the second cluster comprise at least one deformity which is a triangular prism, a side face of the prism being provided transversely to the rear wall, if the at least one deformity forms part of the at least one first cluster, ribs of the prism extend transversely to the direction wherein, in operation, the at least one first light source emits light, and if the at least one deformity forms part of the second cluster, ribs of the prism extend transversely to the direction wherein, in operation, the at least one second light source emits light.

3. A luminaire as claimed in claim 1, wherein the at least one first light source comprises a light-emitting diode.

4. A luminaire as claimed in claim 3, wherein the light-emitting diode comprises a luminous flux of at least 5 lm.

5. A luminaire having a panel, said panel comprising:
- a light emission window,
- a rear wall opposite said light emission window,
- a first edge surface for receiving first light rays, and
- a second edge surface for receiving second light rays,
- said first edge surface and said second edge surface being situated between said light emission window and said rear wall,
- wherein said light emission window or said rear wall includes first deformities which are clustered to form a first light symbol upon incidence of said first light rays, and
- wherein said light emission window or said rear wall includes second deformities which are clustered to form a second light symbol upon incidence of said second light rays.

* * * * *